United States Patent
Boss et al.

(10) Patent No.: US 10,666,670 B2
(45) Date of Patent: *May 26, 2020

(54) MANAGING SECURITY BREACHES IN A NETWORKED COMPUTING ENVIRONMENT

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Jeffrey R. Hoy, Gibsonia, PA (US); Agueda M. H. Magro, Zapopan (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,624

(22) Filed: May 20, 2019

(65) Prior Publication Data

US 2019/0273751 A1    Sep. 5, 2019

Related U.S. Application Data

(63) Continuation of application No. 15/827,003, filed on Nov. 30, 2017, now Pat. No. 10,341,366, which is a
(Continued)

(51) Int. Cl.
| | | |
|---|---|---|
| *G06F 12/14* | (2006.01) | |
| *H04L 29/06* | (2006.01) | |
| *G06F 21/55* | (2013.01) | |

(52) U.S. Cl.
CPC ........ *H04L 63/1416* (2013.01); *G06F 21/552* (2013.01); *H04L 63/1491* (2013.01); *G06F 2221/2127* (2013.01)

(58) Field of Classification Search
USPC .............................. 726/22–25; 713/187–189
See application file for complete search history.

(56) References Cited

U.S. PATENT DOCUMENTS

| | | |
|---|---|---|
| 6,453,345 B2 | 9/2002 | Trcka et al. |
| 6,742,124 B1 | 5/2004 | Kilpatrick et al. |
| (Continued) | | |

FOREIGN PATENT DOCUMENTS

| | | |
|---|---|---|
| CN | 101567887 | 5/2012 |

OTHER PUBLICATIONS

List of IBM Patents or Patent Applications Treated as Related, dated Jul. 29, 2019, 1 page.

(Continued)

*Primary Examiner* — Amare F Tabor
(74) *Attorney, Agent, or Firm* — William H. Hartwell; Andrew M. Calderon; Roberts Calderon Safran & Cole, P.C.

(57) ABSTRACT

Approaches for managing security breaches in a networked computing environment are provided. A method includes detecting, by at least one computer device, a breach of a production system in the networked computing environment, wherein the networked computing environment includes a decoy system interweaved with the production system. The method also includes receiving, by the at least one computer device, a communication after the detecting the breach. The method further includes determining, by the at least one computer device, the communication is associated with one of a valid user and a malicious user. The method additionally includes, based on the determining, routing the valid user to an element of the production system when the communication is associated with the valid user
(Continued)

and routing the malicious user to a corresponding element of the decoy system when the communication is associated with the malicious user.

14 Claims, 9 Drawing Sheets

Related U.S. Application Data continuation of application No. 15/251,023, filed on Aug. 30, 2016, now Pat. No. 9,894,086, which is a continuation of application No. 14/699,279, filed on Apr. 29, 2015, now Pat. No. 9,462,013.

(56) References Cited

U.S. PATENT DOCUMENTS

| | | | |
|---|---|---|---|
| 7,034,476 B2 | 4/2006 | Wang et al. | |
| 7,042,852 B2 | 5/2006 | Hrastar | |
| 7,076,655 B2 | 7/2006 | Griffin et al. | |
| 7,318,237 B2 | 1/2008 | Moriconi et al. | |
| 7,367,055 B2 | 4/2008 | Comer et al. | |
| 7,383,578 B2 | 6/2008 | Blake et al. | |
| 7,437,766 B2 | 10/2008 | Cohen et al. | |
| 7,475,427 B2 | 1/2009 | Palliyil et al. | |
| 7,509,684 B2 | 3/2009 | McDonald et al. | |
| 7,634,812 B2 | 12/2009 | Costa et al. | |
| 7,636,944 B2 | 12/2009 | Raikar | |
| 7,647,637 B2 | 1/2010 | Schuba et al. | |
| 7,668,843 B2 | 2/2010 | Ertoz et al. | |
| 7,694,339 B2 | 4/2010 | Blake et al. | |
| 7,752,432 B2 | 7/2010 | Sheymov | |
| 7,752,669 B2 | 7/2010 | Palliyil et al. | |
| 7,890,612 B2 | 2/2011 | Todd et al. | |
| 7,904,959 B2 | 3/2011 | Sidiroglou et al. | |
| 7,934,258 B2 | 4/2011 | Wahl | |
| 7,962,756 B2 * | 6/2011 | Fagone | G06F 21/55 |
| | | | 713/188 |
| 8,001,583 B2 | 8/2011 | Waizumi et al. | |
| 8,015,606 B1 | 9/2011 | Jevans et al. | |
| 8,060,939 B2 | 11/2011 | Lynn et al. | |
| 8,065,722 B2 | 11/2011 | Barford et al. | |
| 8,122,505 B2 | 2/2012 | Verma et al. | |
| 8,141,152 B1 | 3/2012 | Hwang et al. | |
| 8,156,556 B2 | 4/2012 | Krishnamurthy | |
| 8,161,540 B2 | 4/2012 | Mantripragada et al. | |
| 8,181,250 B2 | 5/2012 | Rafalovich et al. | |
| 8,209,760 B1 | 6/2012 | Hardman | |
| 8,286,237 B2 | 10/2012 | Moghe | |
| 8,413,241 B2 | 4/2013 | Weeks et al. | |
| 8,443,446 B2 | 5/2013 | Lamastra et al. | |
| 8,464,341 B2 | 6/2013 | Cohen | |
| 8,479,288 B2 | 7/2013 | Martin et al. | |
| 8,528,091 B2 | 9/2013 | Bowen et al. | |
| 8,544,087 B1 | 9/2013 | Eskin et al. | |
| 8,549,642 B2 | 10/2013 | Lee | |
| 8,572,244 B2 | 10/2013 | Campagnoni | |
| 8,578,497 B2 | 11/2013 | Antonakakis et al. | |
| 8,584,219 B1 | 11/2013 | Toole et al. | |
| 8,769,687 B2 | 7/2014 | Hoefelmeyer et al. | |
| 8,789,189 B2 | 7/2014 | Capalik et al. | |
| 8,819,825 B2 | 8/2014 | Keromytis et al. | |
| 8,902,066 B2 | 12/2014 | Parker et al. | |
| 8,943,594 B1 | 1/2015 | Arrowood | |
| 8,955,143 B1 | 2/2015 | Ramalingam et al. | |
| 8,973,142 B2 | 3/2015 | Shulman et al. | |
| 9,009,719 B2 | 4/2015 | Ramteke et al. | |
| 9,032,531 B1 | 5/2015 | Scorvo et al. | |
| 9,077,665 B1 | 7/2015 | Loughmiller | |
| 9,094,444 B2 | 7/2015 | Baltatu et al. | |
| 9,106,687 B1 | 8/2015 | Sawhney et al. | |
| 9,106,697 B2 * | 8/2015 | Capalik | H04L 63/1491 |
| 9,118,709 B2 | 8/2015 | Oliphant et al. | |
| 9,356,942 B1 | 5/2016 | Joffe | |
| 9,356,950 B2 * | 5/2016 | Vissamsetty | H04L 63/02 |
| 9,367,809 B2 | 6/2016 | Puri et al. | |
| 9,386,041 B2 * | 7/2016 | Carver | H04L 63/1441 |
| 9,401,927 B2 | 7/2016 | Shulman et al. | |
| 9,462,013 B1 | 10/2016 | Boss et al. | |
| 9,462,521 B2 | 10/2016 | Wang et al. | |
| 9,503,463 B2 | 11/2016 | Karta et al. | |
| 9,609,019 B2 | 3/2017 | Vissamsetty et al. | |
| 9,769,204 B2 | 9/2017 | Vissamsetty et al. | |
| 9,838,416 B1 | 12/2017 | Aziz | |
| 9,875,347 B2 | 1/2018 | Baghdasaryan | |
| 9,894,086 B2 | 2/2018 | Boss et al. | |
| 9,923,908 B2 | 3/2018 | Boss et al. | |
| 9,954,870 B2 | 4/2018 | Boss et al. | |
| 10,171,485 B2 | 1/2019 | Boss et al. | |
| 2003/0105973 A1 | 6/2003 | Liang et al. | |
| 2003/0135762 A1 | 7/2003 | Macaulay | |
| 2004/0078592 A1 * | 4/2004 | Fagone | H04L 63/0272 |
| | | | 726/22 |
| 2004/0111636 A1 | 6/2004 | Baffes et al. | |
| 2005/0166072 A1 | 7/2005 | Converse et al. | |
| 2006/0101516 A1 | 5/2006 | Sudaharan et al. | |
| 2006/0161786 A1 | 7/2006 | Rao | |
| 2008/0082833 A1 | 4/2008 | Lewis et al. | |
| 2008/0222715 A1 | 9/2008 | Bansal et al. | |
| 2008/0271151 A1 * | 10/2008 | Blake | H04L 63/0227 |
| | | | 726/25 |
| 2009/0328213 A1 * | 12/2009 | Blake | H04L 63/1441 |
| | | | 726/23 |
| 2010/0017870 A1 | 1/2010 | Kargupta | |
| 2010/0024017 A1 | 1/2010 | Ashfield et al. | |
| 2010/0122078 A1 | 5/2010 | Sheymov | |
| 2010/0146615 A1 | 6/2010 | Locasto et al. | |
| 2010/0269175 A1 | 10/2010 | Stolfo et al. | |
| 2011/0167494 A1 | 7/2011 | Bowen et al. | |
| 2011/0179487 A1 | 7/2011 | Lee | |
| 2011/0276597 A1 | 11/2011 | Little | |
| 2011/0321165 A1 * | 12/2011 | Capalik | G06F 11/3471 |
| | | | 726/25 |
| 2011/0321166 A1 * | 12/2011 | Capalik | H04L 63/1491 |
| | | | 726/25 |
| 2012/0072990 A1 | 3/2012 | Gutt et al. | |
| 2012/0151585 A1 | 6/2012 | Lamastra et al. | |
| 2013/0097704 A1 | 4/2013 | Gavrilut et al. | |
| 2013/0111540 A1 | 5/2013 | Sabin | |
| 2013/0185763 A1 | 7/2013 | Yasuda | |
| 2013/0318607 A1 | 11/2013 | Reed et al. | |
| 2013/0333037 A1 | 12/2013 | Bowen et al. | |
| 2013/0347111 A1 | 12/2013 | Karte et al. | |
| 2014/0007239 A1 | 1/2014 | Sharpe et al. | |
| 2014/0007264 A1 | 1/2014 | Berger | |
| 2014/0280887 A1 | 9/2014 | Kjendal et al. | |
| 2014/0280889 A1 | 9/2014 | Nispel et al. | |
| 2014/0359708 A1 | 12/2014 | Schwartz | |
| 2014/0359777 A1 | 12/2014 | Lam et al. | |
| 2015/0013006 A1 * | 1/2015 | Shulman | H04L 63/1416 |
| | | | 726/23 |
| 2015/0040220 A1 | 2/2015 | Mantripragada et al. | |
| 2015/0047032 A1 | 2/2015 | Hannis et al. | |
| 2015/0324616 A1 | 11/2015 | Alarabi | |
| 2015/0326599 A1 * | 11/2015 | Vissamsetty | H04L 63/02 |
| | | | 726/11 |
| 2016/0072837 A1 | 3/2016 | Arrowood | |
| 2016/0219069 A1 | 7/2016 | Mittig et al. | |
| 2016/0323300 A1 | 11/2016 | Boss et al. | |
| 2016/0323301 A1 | 11/2016 | Boss et al. | |
| 2016/0373470 A1 | 12/2016 | Boss et al. | |
| 2018/0083989 A1 | 3/2018 | Boss et al. | |
| 2018/0103048 A1 | 4/2018 | Boss et al. | |
| 2018/0109547 A1 | 4/2018 | Boss et al. | |
| 2018/0109548 A1 | 4/2018 | Boss et al. | |
| 2019/0098031 A1 | 3/2019 | Boss et al. | |
| 2019/0132358 A1 * | 5/2019 | DiValentin | H04L 63/1491 |

OTHER PUBLICATIONS

Specification "Data Protection in a Networked Computing Environment" and Drawings in related U.S. Appl. No. 16/509,844, filed Jul. 12, 2019, 43 pages.

(56) References Cited

OTHER PUBLICATIONS

"List of IBM Patents or Patent Applications Treated as Related,", dated May 31, 2019, 1 page.
Specification "Data Protection in a Networked Computing Environment" and Drawings in related U.S. Appl. No. 16/404,236, filed May 6, 2019, 44 pages.
Notice of Allowance in related U.S. Appl. No. 16/204,354 dated May 23, 2019, 9 pages.
Notice of Allowance in related U.S. Appl. No. 15/842,952 dated May 1, 2019, 7 pages.
Locasto et al., "FLIPS: Hybrid Adaptive Intrusion Prevention", Recent Advances in Intrusion Detection, 2005, abstract only, 3 pages.
Cho et al., "Hybrid Network Defense Model Based on Fuzzy Evaluation", The Scientific World Journal, vol. 2014, Article ID: 178937, 13 pages.
Wikipedia, "Honeypot (computing)", http://en.wikipedia.org/wiki/Honeypot_(computing), Apr. 3, 2015, 6 pages.
Vollmer et al., "Cyber-Physical System Security With Deceptive Virtual Hosts for Industrial Control Networks", IEEE Transactions on Industrial Informatics, vol. 10, No. 2, 2014, pp. 1337-1347.
Blowers et al., "Machine Learning Applied to Cyber Operations", Advances in Information Security, vol. 55, 2014, pp. 155-175.
Mell et al., "The NIST Definition of Cloud Computing", NIST, Special Publication 800-145, Sep. 2011, 7 pages.
Shimoda et al., "Sensor in the Dark: Building Untraceable Large-Scale Honeypots Using Virtualization Technologies", IEEE/IPSJ, 2010, 9 pages.
Kaur et al., G., "Intrusion Detection System Using Honeypots and Swarm Intelligence", ACAi, 2011, 5 pages.
List of IBM Patents or Patent Applications Treated as Related dated May 20, 2019, 1 page.
Office Action dated Aug. 8, 2019 in related U.S. Appl. No. 16/404,236, 12 pages.
Notice of Allowance dated Sep. 3, 2019 in related U.S. Appl. No. 16/204,354, 5 pages.
Office Action issued in U.S. Appl. No. 16/404,236 dated Nov. 25, 2019, 9 pages.
Notice of Allowance issued in U.S. Appl. No. 16/404,236 dated Feb. 11, 2020, 5 pages.
Office Action issued in U.S. Appl. No. 16/509,844 dated Feb. 21, 2020, 16 pages.

* cited by examiner

MANAGING SECURITY BREACHES IN A NETWORKED COMPUTING ENVIRONMENT

FIELD OF THE INVENTION

The present invention generally relates to data security, and more particularly, to managing security breaches in a networked computing environment.

BACKGROUND

Cloud computing has become popular as organizations are discovering that it provides a cost-effective, scalable, and flexible option to deliver business or consume IT (Information Technology) services over a network environment such as the Internet. Cloud computing presents unique issues in terms of data security. A honeypot is a data security tool used to lure attackers and analyze attacker activity in computing environments. Use of honeypots in cloud environments is generally limited to generation of additional environments, some of which are honeypots with falsified data.

The concept of a honeypot for data security was introduced as an information system resource that helps to detect unauthorized use such as malicious attacks. There are two main types of honeypots: a production honeypot to protect an organization, and a research honeypot to predict, monitor, and learn. Honeypots can be automatically provisioned in cloud environments, and provisioned based on attacker activity. However, these solutions have considerable drawbacks of affecting either valid users or attacker system usage, which limits the value of the honeypot. As a result, traditional automated honeypot generation in a cloud environment suffers from several major limitations. For example, in systems that create honeypots up front (e.g., multiple application environments where one environment is the true environment), legitimate users still need to be routed to the valid environment. Therefore, sophisticated attackers can identify the valid environment with relative ease, and the value of the decoy (honeypot) environments is limited mainly to non-targeted attackers that would stumble onto such an environment.

SUMMARY

In a first aspect of the invention, there is a method of managing security breaches in a networked computing environment. The method includes detecting, by at least one computer device, a breach of a production system in the networked computing environment, wherein the networked computing environment comprises a decoy system interweaved with the production system. The method also includes receiving, by the at least one computer device, a communication after the detecting the breach. The method further includes determining, by the at least one computer device, the communication is associated with one of a valid user and a malicious user. The method additionally includes, based on the determining, routing the valid user to an element of the production system when the communication is associated with the valid user and routing the malicious user to a corresponding element of the decoy system when the communication is associated with the malicious user.

In another aspect of the invention there is a system for managing security breaches. The system includes at least one computer device in a networked computing environment, wherein the at least one computer device is configured to: determine an identification of a malicious user and a detected layer of a breach of a production system of the networked computing environment; route a valid user to an element of the production system; and route the malicious user to a corresponding element of a decoy system of the networked computing environment based on the determined identification of the malicious user and the detected layer of the breach.

In another aspect of the invention there is a system for managing security breaches. The system includes a networked computing environment including: an external security device in a first layer; a production application server and a decoy application server in a second layer; an internal security device in a third layer; and a production database and a decoy database in a fourth layer. A malicious user associated with a breach is routed to at least one of the decoy application server and the decoy database, and a valid user is routed to the production application server and the production database.

In another aspect of the invention, there is a computer program product for managing security breaches. The computer program product includes a computer readable storage medium having program instructions embodied therewith. The program instructions are executable by a computer device to cause the computer device to: determine an identification of a malicious user and a detected layer of a breach of a production system of a networked computing environment, wherein the determining comprises receiving or obtaining the identification of the malicious user and the detected layer of the breach from a breach tool; route a valid user to an element of the production system after the breach; and route the malicious user to an element of a decoy system of the networked computing environment based on the identification of the malicious user and the detected layer of the breach.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
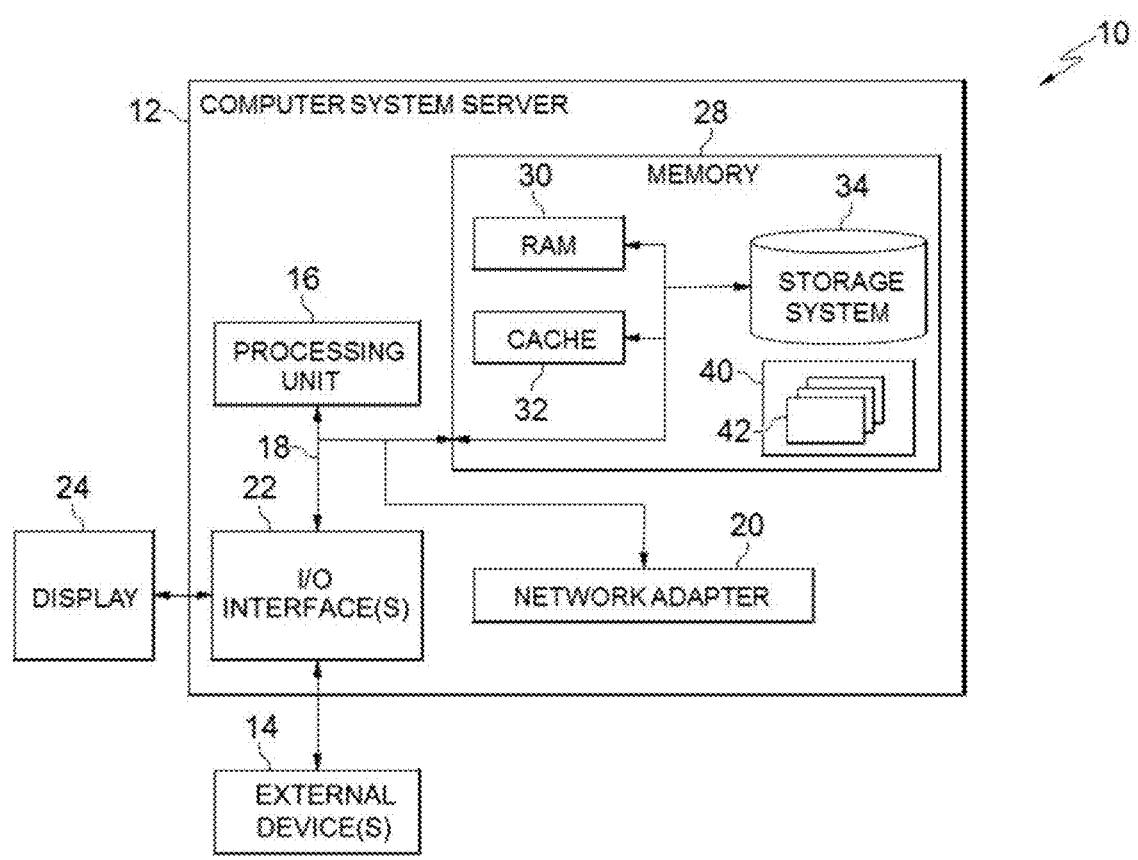
FIG. 1 depicts a cloud computing node according to an embodiment of the present invention.

The present invention generally relates to data security, and more particularly, to managing security breaches in a networked computing environment. In accordance with aspects of the invention, security breaches of a cloud-based production system are managed by interweaving a honeypot system with the production system, leaving the production system intact when a breach is detected, and routing the detected attacker to the honeypot system based on a detected point of entry of the attacker into the production system. In embodiments, a cloud infrastructure is deployed as a hybrid-honeypot system that overlaps a honeypot system with a production system. By keeping the production system intact and by permitting the detected attacker to continue using the production system up to their detected level of entry, the hybrid-honeypot system is less likely to provide an attacker with any clues that they have been detected. In this manner, implementations of the invention use honeypots in hybrid ways for honeypot analysis while mitigating impact on valid users.

Aspects of the invention described herein are directed to systems and methods that help protect data in a cloud environment by enhancing the capabilities of a cloud-based honeypot. In embodiments, these functions are achieved by providing a schema of generating interweaved valid production environments and invalid honeypot environments, e.g., a hybrid honeypot. This may include, for example, interweaving a honeypot into the same infrastructure as a valid environment to create a hybrid-honeypot with layer-based switching between honeypot and valid capability based on source validity.

Implementations may also include automating user activity that appears valid because it is mirrored after real data. This may include, for example, automated generation of valid-user-like activity within a honeypot to avoid tipping off attackers who are monitoring usage.

Implementations may also include creating proxy front door entry points that act as honeypots. This may include, for example, layering of a front-door honeypot directly in front of a valid system, where the honeypot acts as a pass-through for legitimate users to the valid system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
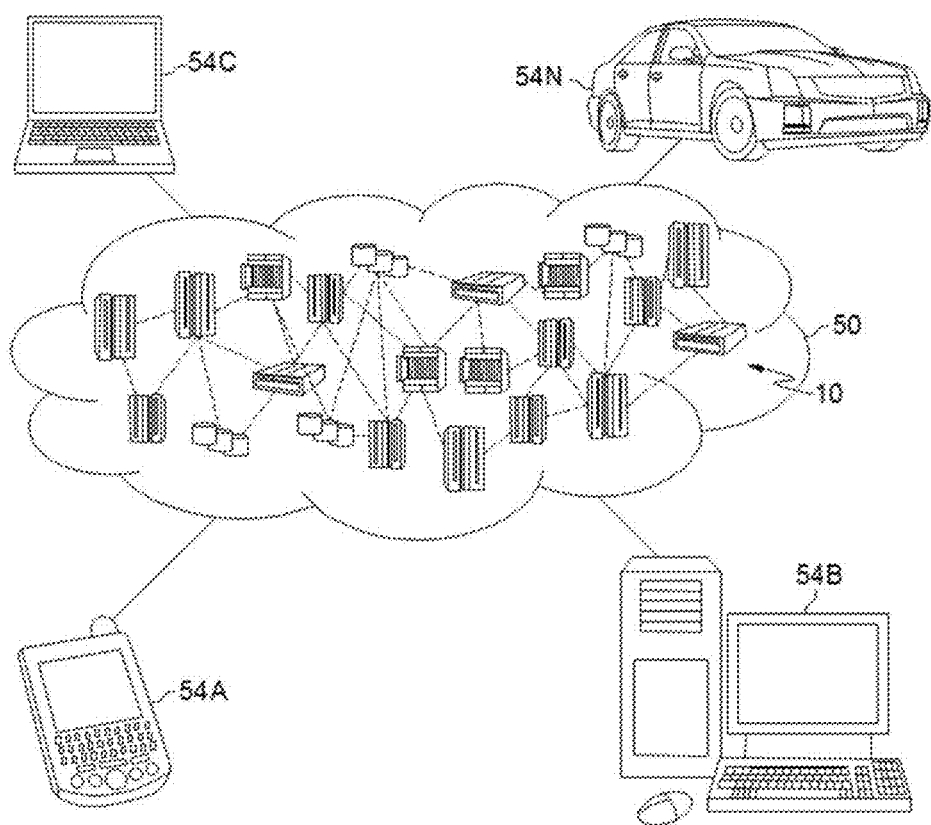
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
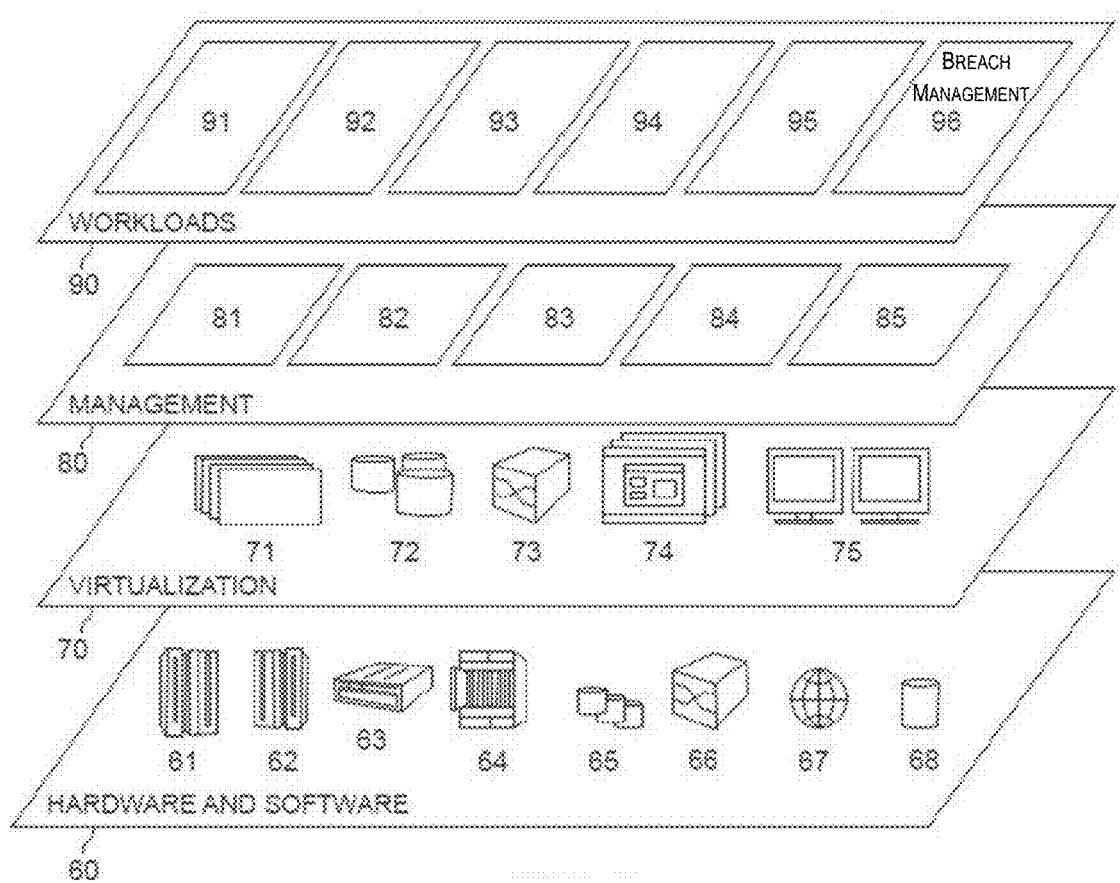
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breach management 96. As described herein, breach management may include: detecting a breach (e.g., an attack or other malicious activity) at a production system; determining a point of entry of the breach; permitting the attacker to access the production system at layers up to the point of entry and routing the attacker to a honeypot system at layers downstream of the point of entry; generating activity on the honeypot system in an automated manner; and provisioning a honeypot proxy that encapsulates the production system.

Figure 4:
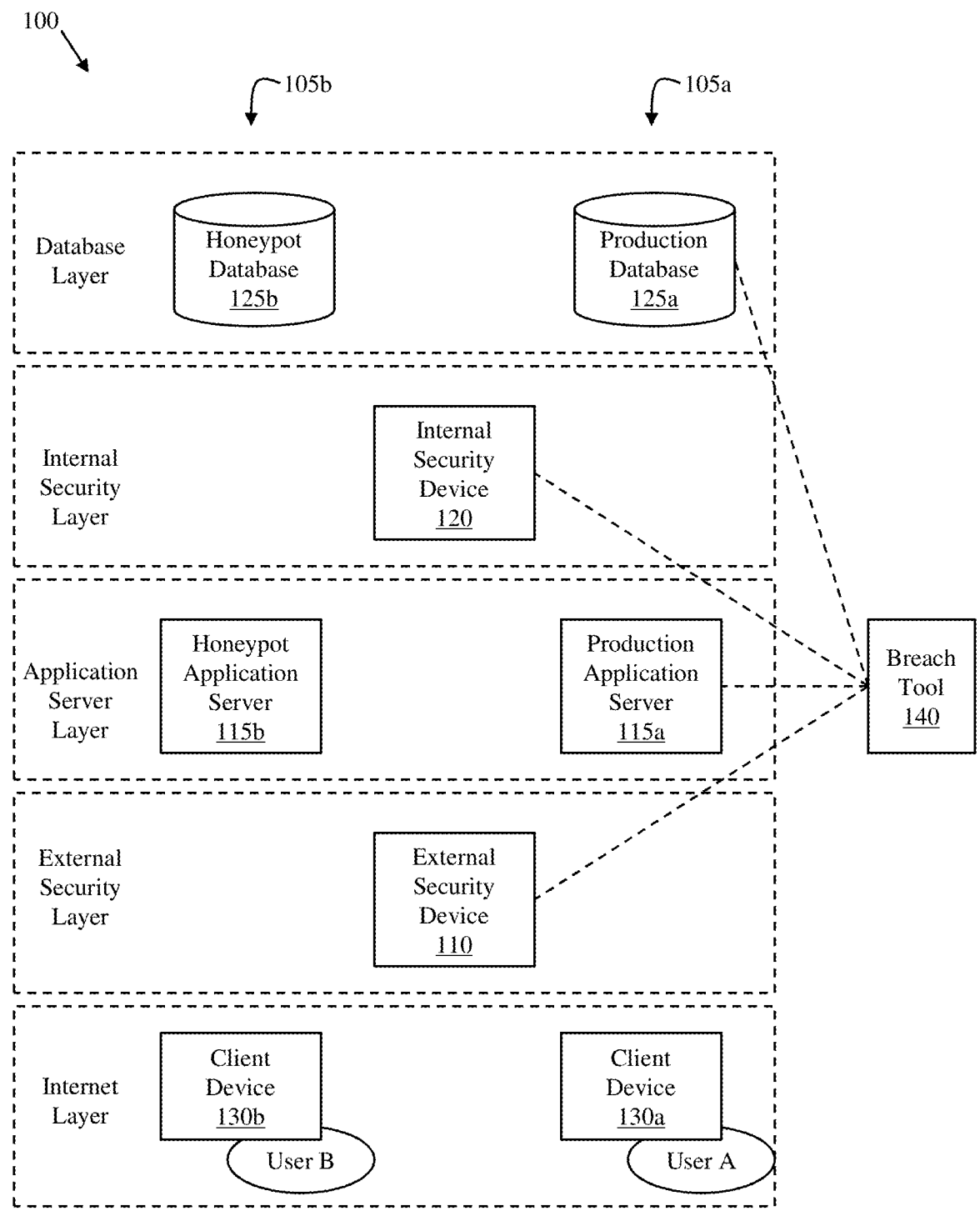
FIGS. 4-7 depict an illustrative environment and functionality in accordance with aspects of the invention.

FIG. 4 depicts an illustrative environment for implementing the steps in accordance with aspects of the invention. Specifically, FIG. 4 shows a hybrid-honeypot system 100 in a networked computing environment in which a production system 105a is interweaved with a honeypot system 105b. The production system 105a includes elements (e.g., physical or virtual machines) at plural layers (or tiers) such as, for example, an external security device 110 at an external security layer, a production application server 115a at an application server layer, an internal security device 120 at an internal security layer, and a production database 125a at a database layer. The production system 105a is intended to be accessed by valid users for legitimate purposes.

In accordance with aspects of the invention, the honeypot (decoy) system 105b is set up in parallel to the production system 105a and includes honeypot (decoy) elements corresponding to certain ones of the elements of the production system 105a. For example, the honeypot system 105b may include a honeypot application server 115b at the same layer as the application server 115a. Similarly, the honeypot system 105b may include a honeypot database 125b at the same layer as the production database 125a. In embodiments, the honeypot application server 115b is a separate and distinct machine (physical or virtual) from the application server 115a, and the honeypot database 125b is a separate and distinct machine (physical or virtual) from the production database 125a. Moreover, the honeypot database 125b may be populated with different data than the production database 125a. For example, the production database 125a may store real data associated with valid users of the production system 105a, whereas the honeypot database 125b may store fake data that is different from the real data.

The elements of the honeypot system 105b have very limited or no production value; in other words, the honeypot system 105b performs no significant work within the enterprise other than acting as a decoy and monitoring for activity. Since the honeypot system 105b has no significant production value, its value lies in the fact that it acts as a decoy to divert the attention of malicious users or hackers away from the elements of the production system 105a that have true value within the enterprise. In addition, the honeypot system 105b can be monitored to collect information about actions taken by already-identified malicious users or hackers.

The various elements of the hybrid-honeypot system 100 may be provisioned as devices in a networked computing environment such as a cloud environment. For example, the production application server 115a, the honeypot application server 115b, the production database 125a, and the honeypot database 125b may be embodied as cloud computing nodes 10 of the cloud computing environment 50 described with respect to FIG. 2. The cloud environment may be a private cloud environment used by an enterprise, e.g., to conduct business functions. As is understood in the art, an application server may include a computing device that hosts an application program and serves the application program to a networked client computing device. As is further understood in the art, a database may include a collection of data that is stored on a computing device and that is accessed through an application server. The elements 115a, 115b, 125a, 125b may be at respective different cloud computing nodes 10 of the cloud computing environment 50. The layers depicted in FIG. 4 are a representative example and not limiting in the system topology. Aspects of the invention are not limited to the specific layers and elements shown in FIG. 4, and other types and/or numbers of layers and/or elements may be used. For example, a user repository may be included in another layer of the production system and a corresponding honeypot user repository may be included in the same layer.

With continued reference to FIG. 4, the external security device 110 and the internal security device 120 may also be embodied as one or more cloud computing nodes 10 of the cloud computing environment 50 described with respect to FIG. 2. For example, the external security device 110 and the internal security device 120 may each comprise a respective firewall computing device programmed with intelligent switching and/or routing functionality as described herein.

As depicted in FIG. 4, users may access the elements of the production system 105a by way of client devices 130a, 130b in an Internet layer. The client devices 130a, 130b may be conventional user computer devices, such as computing devices 54A-N shown in FIG. 2, that are communicatively connected to a network (i.e., the Internet) that in turn is connected to the external security device 110. Although two client devices 130a, 130b are shown, it is understood that any number of client devices may be used with aspects of the invention.

A user using a client device (e.g., User A using client device 130a) may request and obtain access to the production application server 115a and the production database 125a by providing credentials that are authenticated by the external security device 110 and/or the internal security device 120. In this manner, a valid user is routed to the production system 105a, and is not routed to the honeypot system 105b. A malicious user, on the other hand, is routed to the honeypot system 105b.

According to aspects of the invention, the hybrid-honeypot system 100 includes a breach tool 140 that is configured to detect a breach of the production system 105a by a client device (e.g., client device 130b). In embodiments, the breach tool 140 is a program module 42 of a cloud computing node 10 (as shown in FIG. 1) and communicates with the external security device 110, the production application server 115a, the internal security device 120, and the production database 125a. The security devices may thus be enhanced versions of existing devices such as firewalls, where the enhancements allow for awareness of malicious and non-malicious users. The breach tool 140 may be programmed with logic that is configured to detect a breach of the production system 105a by a client device. For example, the breach tool 140 may detect a breach based on collecting and analyzing data from the production system 105a. Specifically, the breach tool 140 may use security and/or forensic software to collect and/or analyze data including at least one of: geographic location of the client device; multiple failed login attempts by the client device within a time period; port scanning by the client device; abnormally large number of data requests by the client device within a time period; and abnormally large amount (volume) of data requested by the client device within a time period. The data collected by the breach tool 140 may be used in an automated or semi-automated manner to flag certain behavior as a breach. For example, a human user, such as an IT security analyst, may use the data obtained by the breach tool 140 to perform a forensic analysis of actions taken at the production system 105a for the purpose of identifying a breach. Implementations of the invention are not limited to these techniques for detecting a breach, and any suitable techniques (conventional or later developed) may be utilized by the breach tool 140.

In embodiments, after detecting a breach, the breach tool 140 communicates an identification of a malicious user associated with the breach to the external security device 110 and the internal security device 120. The identification of the malicious user may be, for example, a user identification and/or a device identification. Based on the identification of the malicious user, the external security device 110 and the internal security device 120 intelligently route identified malicious users to elements of the honeypot system 105b instead of elements of the production system 105a. In embodiments, the external security device 110 and the internal security device 120 each maintain a list of identified malicious users that are detected by the breach tool 140, and are configured to route a user to the production system 105a when the user is not included in the list and alternatively to route the user to the honeypot system 105b when the user is included in the list.

Figure 5:
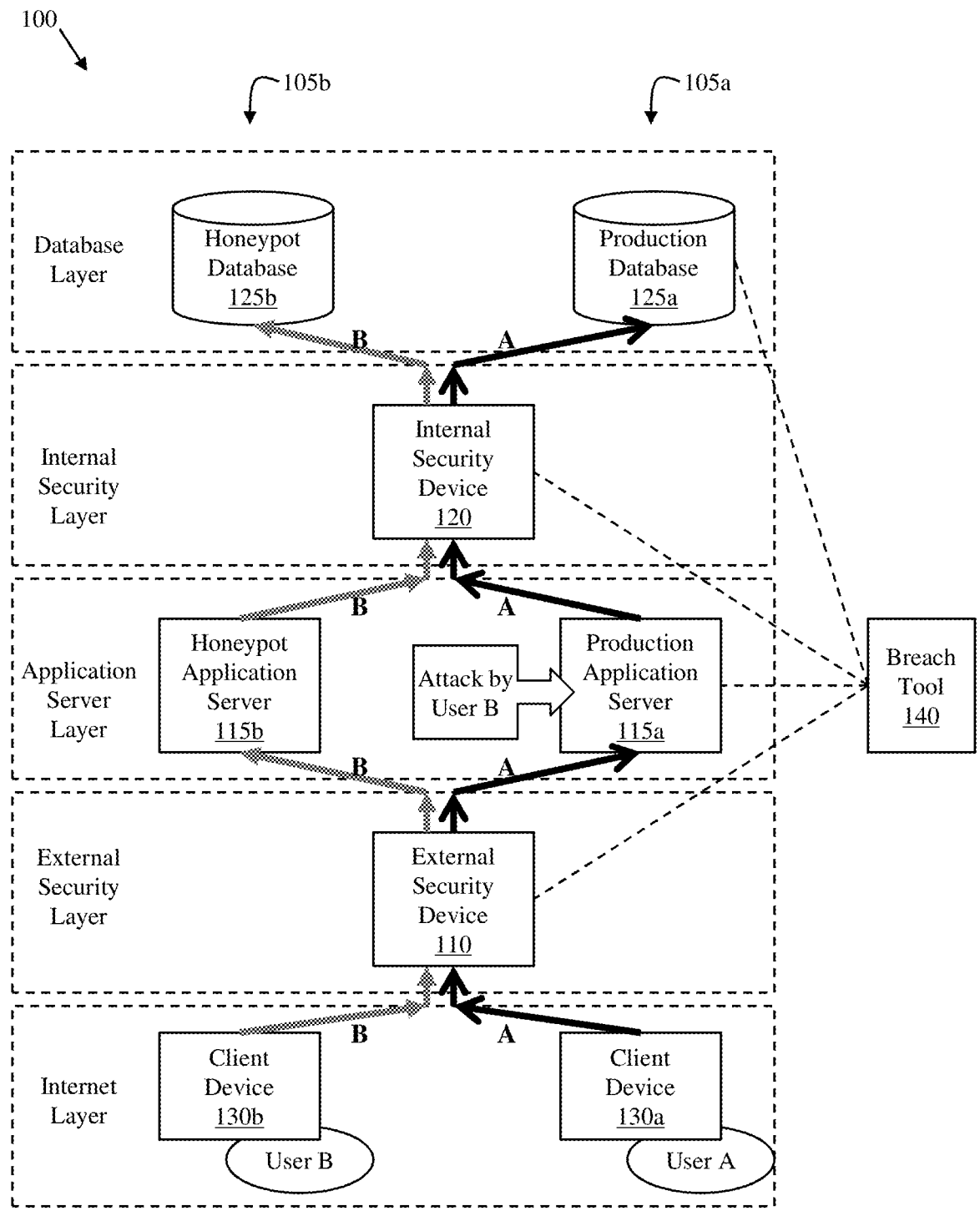

FIG. 5 shows an example of routing a valid user and a malicious user in the hybrid-honeypot system 100 in accordance with an embodiment of the invention. In this example, User A is a valid user and is routed to the production application server 115a by the external security device 110, and is routed to the production database 125a by the internal security device 120 (as indicated by arrows labeled "A"). Also in this example, the breach tool 140 detects a breach (e.g., attack) by User B at the production application server 115a. Accordingly, the breach tool 140 flags User B as a malicious user and communicates the identity of User B to the external security device 110 and to the internal security device 120. When User B subsequently attempts to access to the production application server 115a, the external security device 110 routes User B to the honeypot application server 115b (as indicated by arrows labeled "B") instead of the production application server 115a. Similarly, when User B subsequently attempts to access the production database 125a, the internal security device 120 routes User B to the honeypot database 125b (as indicated by arrows labeled "B") instead of the production database 125a.

Figure 6:
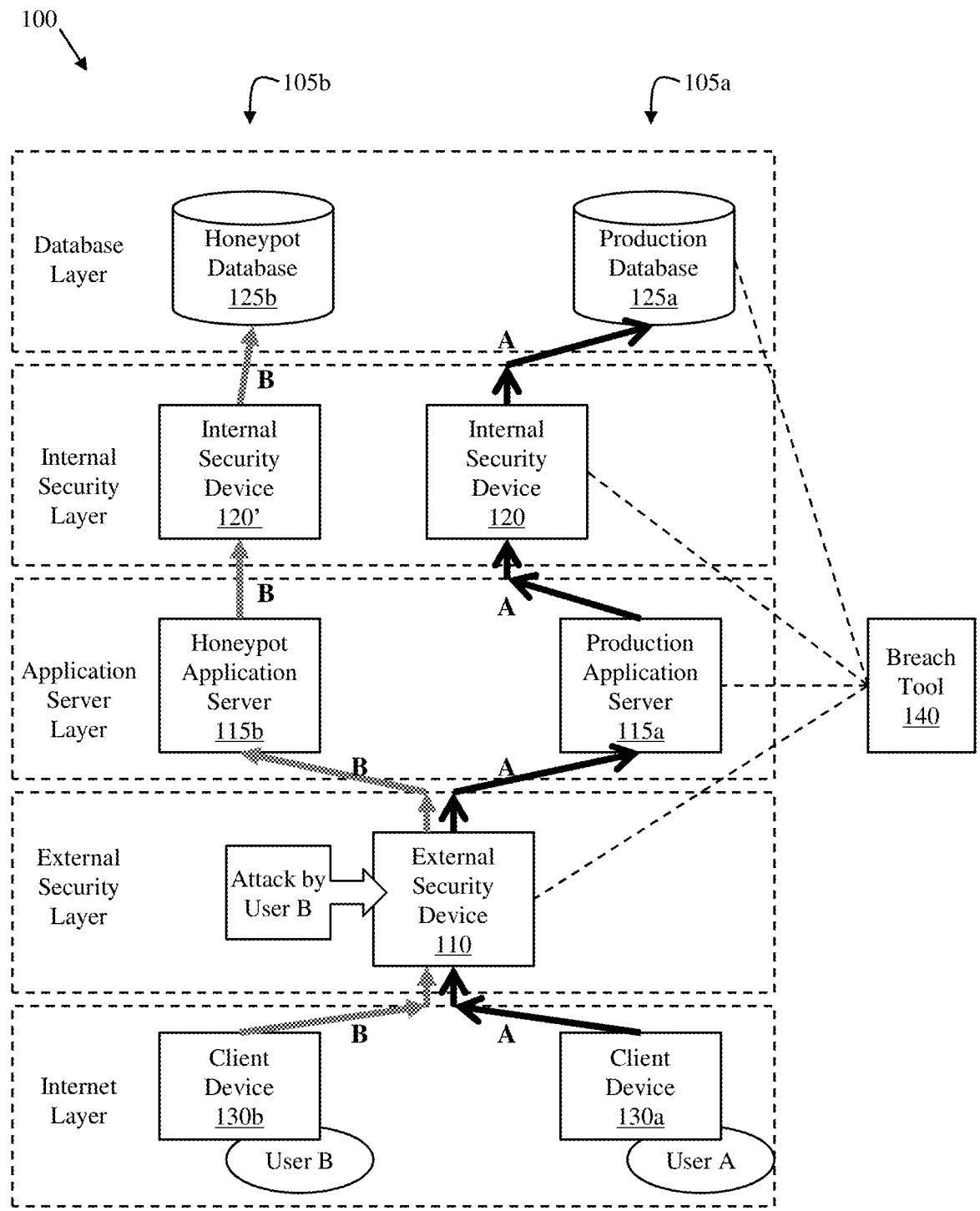
Figure 7:
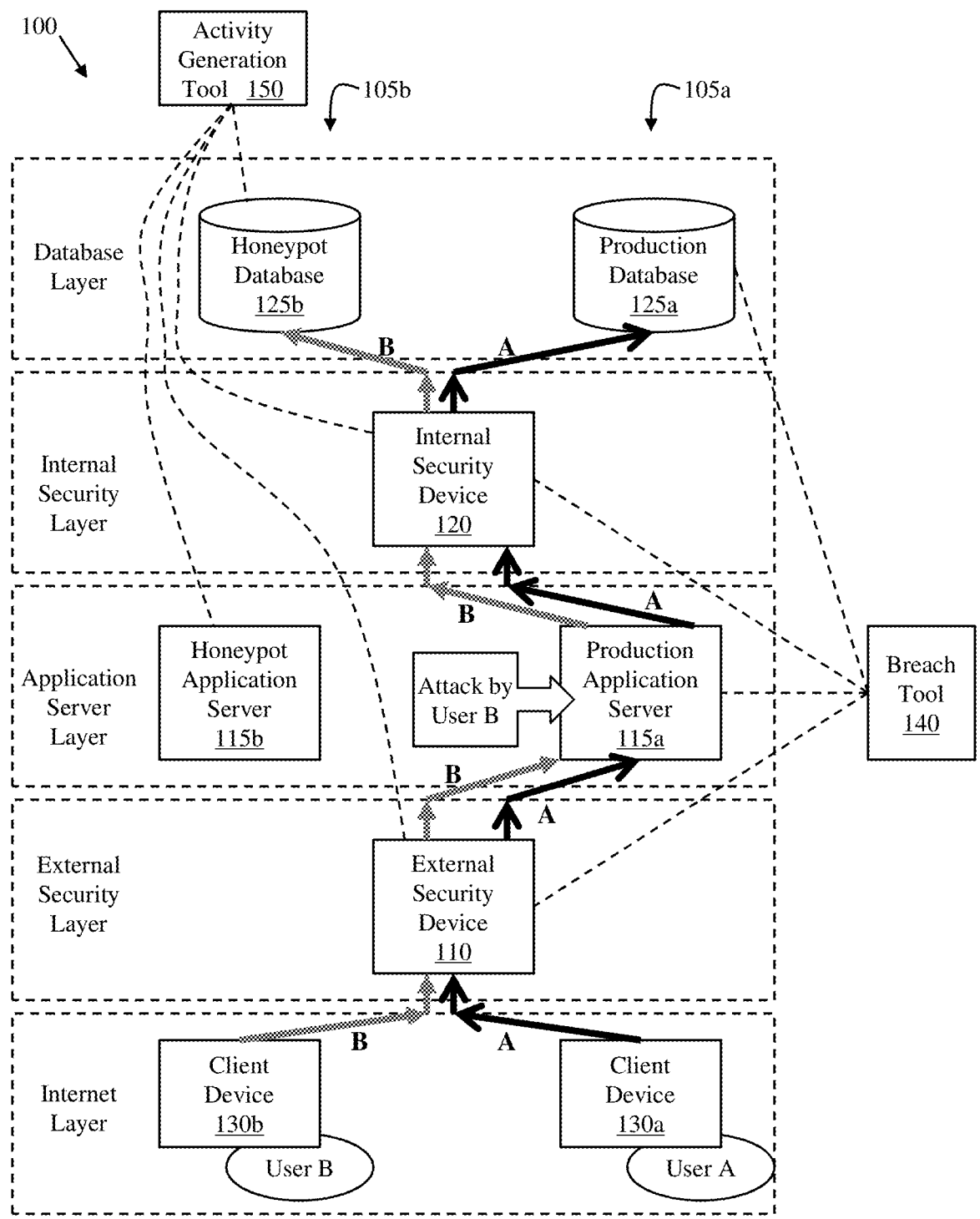

FIGS. 6 and 7 show examples of routing a valid user and a malicious user in the hybrid-honeypot system 100 in accordance with aspects of the invention. In embodiments, the breach tool 140 is configured to detect the layer at which the breach occurred, and to communicate the identity of this layer to the security devices 110, 120 along with the identity of the malicious user. The external security device 110 and the internal security device 120 are configured to leverage this information to route the identified malicious user to the production system up to the identified layer of the breach, and to route the identified malicious user to the honeypot system for layers downstream of the identified layer of the breach.

In the example depicted in FIG. 6, User A is a valid user that is routed to the production application server 115a by the external security device 110, and routed to the production database 125a by the internal security device 120, as indicated by arrows "A". Also in the example of FIG. 6, the breach tool 140 detects a breach by User B at external security device 110 in the external security layer. Accordingly, the breach tool 140 flags User B as a malicious user and communicates the identity of User B and the layer of the breach (i.e., the external security layer) to the external security device 110 and to the internal security device 120. When User B subsequently attempts to access to the production system, the external security device 110 routes User B to the honeypot application server 115b, to a honeypot instance of the internal security device 120', and to the honeypot database 125b, as indicated by arrows "B".

In the example depicted in FIG. 7, User A is a valid user that is routed to the production application server 115a by the external security device 110, and routed to the production database 125a by the internal security device 120, as indicated by arrows "A". Also in the example of FIG. 7, the breach tool 140 detects a breach by User B at the production application server 115a at the application server layer. Accordingly, the breach tool 140 flags User B as a malicious user and communicates the identity of User B and the layer of the breach (i.e., the application server layer) to the external security device 110 and to the internal security device 120. When User B subsequently attempts to access the production system, the external security device 110 routes User B to the production application server 115a, and the internal security device 120 routes User B to the honeypot database 125b, as indicated by arrows "B".

As depicted in FIGS. 6 and 7, the system may be configured to route the identified malicious user to the honeypot system for all layers downstream of the layer at which the user's breach was detected. The system thus routes an identified malicious user to the honeypot system based on both: (i) the identification of the user and (ii) the layer at which the user's breach was detected.

With continued reference to FIGS. 4-7, the hybrid-honeypot system 100 in accordance with aspects of the invention leverages cloud automated deployment capability to generate a honeypot (decoy) environment based on the production (source) environment. However unlike a conventional honeypot deployment that is deployed alongside and isolated from the production environment, the hybrid-honeypot system 100 instead overlays the honeypot environment directly into the fabric of the production environment. All users (e.g., both valid a known malicious users)

enter the system through the same endpoint (e.g., the external security device 110). A particular user is then routed to the production system or the honeypot system based on the user's validation (authentication) and any detected malicious activity associated with the user. In embodiments, the system routes an identified malicious user to honeypot elements based on the layer at which the user's breach was detected. In this way a user can be switched between valid and invalid without alerting them to the switch, and without any apparent changes to the environment.

In accordance with further aspects of the invention, test automation tools are leveraged to generate activity at the elements of the honeypot system so that the honeypot system appears to be a valid system that is in use rather than a decoy that is idle. For example, as shown in FIG. 7, an activity generation tool 150 may be included in the hybrid-honeypot system 100. In embodiments, the activity generation tool 150 is a program module 42 of a cloud computing node 10 (as shown in FIG. 1) and communicates with at least one of the external security device 110, the honeypot application server 115b, the internal security device 120, and the honeypot database 125b. The activity generation tool 150 may be programmed with logic that is configured to automatically generate activity (e.g., network traffic) at the honeypot application server 115b and the honeypot database 125b. In one example, the generated activity may be random, e.g., accessing among a set of endpoints in the honeypot application server 115b and/or the honeypot database 125b. In another example, the generated activity may be modeled based on automated test scenarios created during production development. In yet another example, the generated activity may be modeled based on valid user activity in the production system in an effort to mimic the valid user activity. In this manner, implementations of the invention generate activity (e.g., fake traffic) at the honeypot elements to make it appear to an attacker as though the honeypot elements are instead valid production elements. In this manner, the attacker is less likely to determine that the honeypot system is a decoy.

Figure 8:
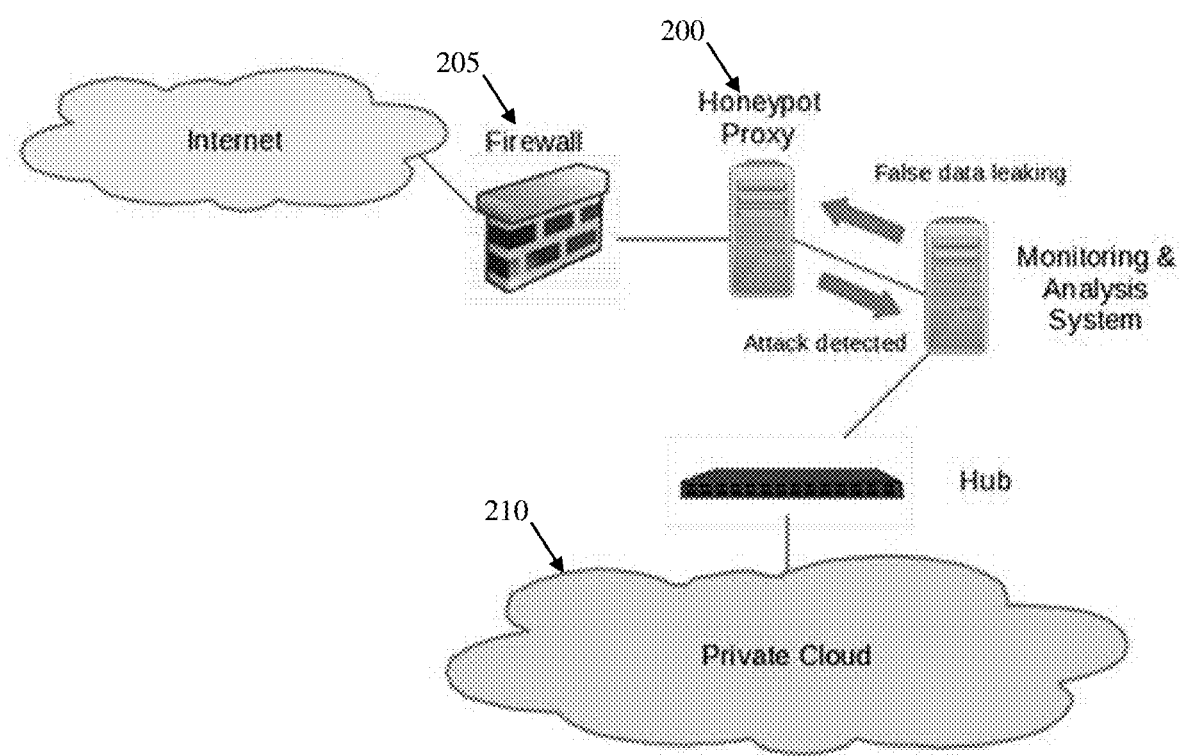
FIG. 8 depicts another illustrative environment and functionality in accordance with aspects of the invention.

In accordance with further aspects of the invention, the production system is encapsulated inside or hidden behind a honeypot. The honeypot itself may be in a proxy or reverse proxy configuration so that all data that passes to the production system goes through the honeypot first. In this manner, the honeypot serves as an additional distraction to attackers (e.g., malicious users). As shown in FIG. 8, in embodiments a segmented network of honeypots 200 is placed between the load balancers/firewall 205 and the production servers in the private cloud 210. These honeypots 200 may have similar names to real production servers and are generating traffic (e.g., looking busy) although they are in fact decoys. The only route from the external security layer to the production servers is through the interim network of honeypots 200. The routers for this network forward valid traffic to the production servers; but an attacker that gets by the firewall 205 will find the honeypot 200 first. In this way, aspects of the invention ensure intentional weaknesses are seen in the honeypot before the production systems are attacked.

Likewise, the honeypot portions could be layered at any point in the system. This would be useful if wanting to restrict a known attacker from all true systems behind the point of the breach, for example to keep an attacker off a sensitive data tier. This has the advantage of clean separation of an attacker at the point they are detected, so as to provide the illusion of a production system without providing any access beyond the point of compromise.

Figure 9:
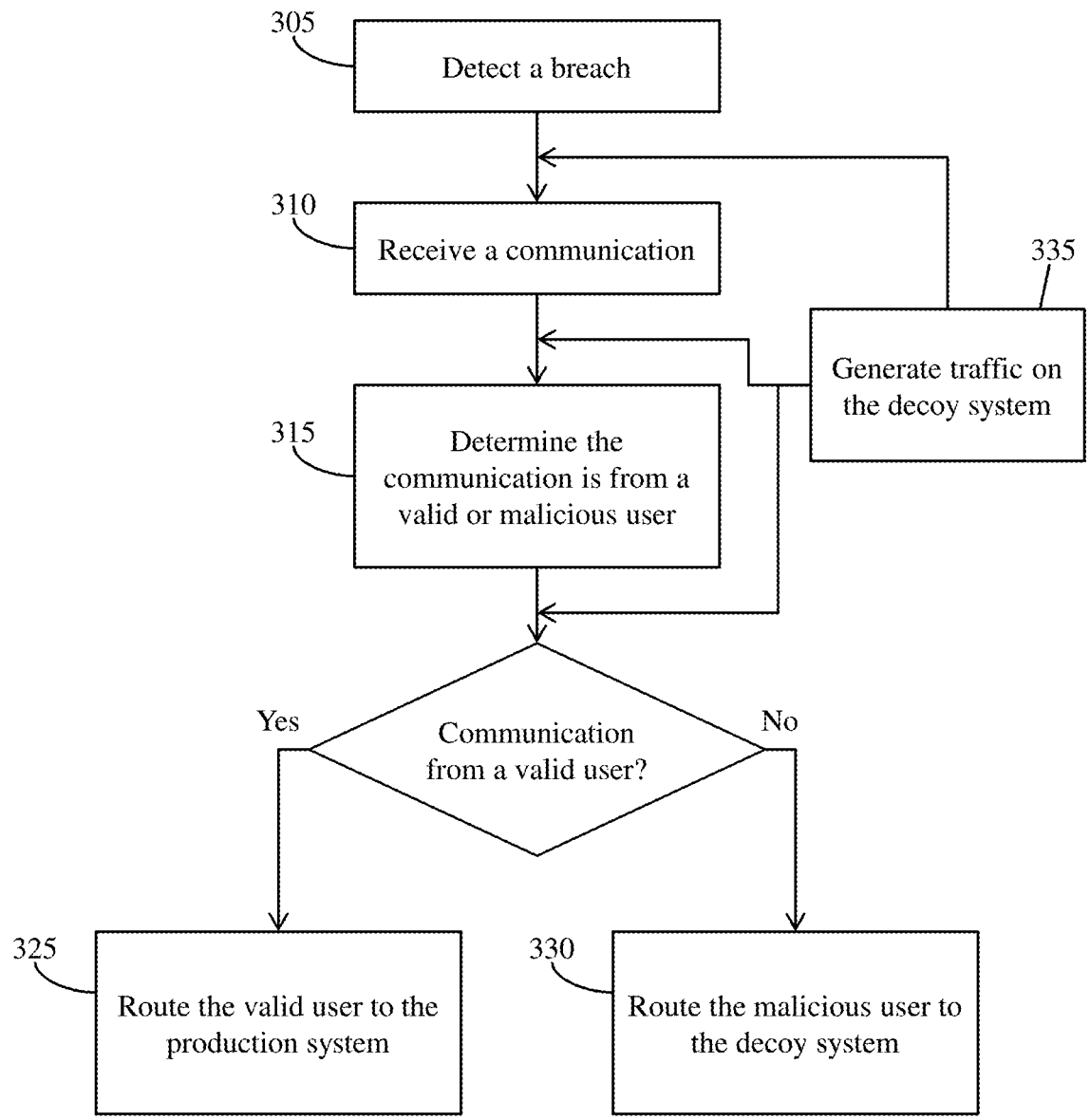
FIG. 9 depicts a flow diagram of an exemplary process in accordance with aspects of the invention.

FIG. 9 shows an exemplary flow for performing aspects of the present invention. The steps of FIG. 9 may be implemented in the environments of FIGS. 1-8, for example. As noted above, the flowchart(s) illustrate the architecture, functionality, and operation of possible implementations of systems, methods, and computer program products according to various embodiments of the present invention.

FIG. 9 depicts an exemplary flow for a process in accordance with aspects of the present invention. At step 305, a breach is detected in a networked computing environment. In embodiments, the networked computing environment may include a hybrid-honeypot system that includes a production system interweaved with a decoy (honeypot) system, such as that described with respect to FIGS. 4-7. The breach may be an attack or other malicious activity at one of the elements or layers of the system, e.g., as described with respect to FIGS. 4-7. For example, the breach may comprise activity such as: multiple failed login attempts by a client device followed by a successful login attempt; port scanning by the client device; abnormally large number of data requests by the client device; and abnormally large amount (volume) of data requested by the client device, and other types of attacks or malicious behavior. The breach may be detected by a breach tool (such as breach tool 140 of FIGS. 4-7) that communicates with one or more elements of the networked computing environment. Detecting the breach may include determining an identity of a malicious user (i.e., user ID and/or device ID) associated with the breach, and determining a layer of the networked computing environment at which the breach occurred.

At step 310, the system receives a communication after the detected breach. The communication may include, for example, a request or command from a client device outside the networked computing environment (e.g., client device 130b in the Internet layer, as described in FIGS. 4-7). The communication may be received at a security/routing device at an external security layer of the networked computing environment (e.g., external security device 110).

At step 315, the system determines whether the communication is from a valid user or a malicious user. In embodiments, the security/routing device receives or obtains a list of identified malicious users from the breach tool. The security/routing device may also store or have access to a list of valid users. The security/routing device may determine whether the communication is associated with a valid user or a malicious user by comparing data associated with the communication (e.g., user ID and/or device ID) to the list of identified malicious users and the list of valid users.

In the event that communication is determined to be from a valid user, then at step 325 the system routes the valid user to one or more elements of the production system, e.g., as shown at arrows "A" in FIGS. 5-7. On the other hand, when the communication is determined to be from a malicious user, then at step 330 the system routes the malicious user to one or more elements of the decoy system, e.g., as shown at arrows "B" in FIGS. 5-7. The production system is thus maintained intact (e.g., operative without migrating or re-provisioning) for servicing valid users even after the detecting the breach. In this manner, aspects of the invention hide the detection of the breach from the malicious user.

The routing of a malicious user at step 330 may be based on the layer at which the breach occurred, as illustrated at FIGS. 6 and 7. For example, the routing may include: permitting the malicious user to access at least one element of the production system in one or more first layers up to and including the layer at which the breach occurred; and switching the malicious user to at least one element of the decoy system in one or more second layers downstream of the layer at which the breach occurred. The routing may be accomplished by one or more security/routing devices in the networked computing environment (e.g., security devices 110, 120).

As indicated at step 335, the system may be configured to generate automated traffic on elements of the decoy system. This may be accomplished, for example, using the activity generation tool 150 described with respect to FIG. 7. The traffic may be generated at any time (i.e., before, during, or after) any of the other steps.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for breach management on a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing security breaches in a networked computing environment, comprising:

receiving, by at least one computer device, a communication;

determining, by the at least one computer device, whether the communication is associated with a valid user or a malicious user; and in response to determining that the communication is associated with the malicious user, routing the malicious user to an element of a decoy system in the networked computing environment which comprises the decoy system and a production system, wherein:

the decoy system is separate from the production system and comprises elements corresponding to elements of the production system;

the routing comprises permitting the malicious user to access at least one element of the production system in one or more first layers;

the networked computing environment comprises layers, and further comprising determining one of the layers at which a breach occurred; and the routing further comprises routing the malicious user to at least one element of the decoy system in one or more second layers downstream of the determined one of the layers.

2. The method of claim 1, wherein the decoy system stores fake data that is different from real data stored in the production system, and further comprising maintaining the production system intact for servicing valid users after detecting the breach.

3. The method of claim 1, wherein a service provider at least one of creates, maintains, deploys and supports the at least one computer device.

4. The method of claim 1, wherein the receiving the communication, the determining, and the routing are provided by a service provider on a subscription, advertising, and/or fee basis.

5. The method of claim 1, wherein the receiving the communication, the determining, and the routing are provided by software as a service in a cloud environment.

6. The method of claim 2, wherein the malicious user is denied access beyond the determined one of the layers.

7. The method of claim 1, wherein the determining whether the communication is associated with the valid user or the malicious user comprises comparing data associated with the communication to a list of identified malicious users and a list of valid users.

8. A system for managing security breaches, comprising:
a networked computing environment comprising:
a first layer;
a production application server and a decoy application server in a second layer;
a third layer; and
a production database and a decoy database in a fourth layer,
wherein:
the decoy application server corresponds to and is separate from the production application server, and the decoy database corresponds to and is separate from the production database,
the system is configured to route a malicious user associated with a breach to the production application server and the decoy database based on a detected layer of the breach being one of the second layer and the third layer,
the decoy database stores fake data that is different from real data stored in the production database, and
the system is configured to route the malicious user associated with the breach to the decoy application server and the decoy database based on the detected layer of the breach being the first layer, and route a valid user to the production application server and the production database.

9. The system of claim 8, wherein the malicious user and the valid user access the networked computing environment via respective client devices communicating with an external security device.

10. The system of claim 8, further comprising a breach tool configured to determine a layer at which the breach occurred.

11. The system of claim 10, wherein the system is further configured to route the malicious user to the decoy application server and the decoy database based on the breach tool determining the breach occurred at the first layer.

12. The system of claim 10, wherein the system is further configured to route the malicious user to the production application server and the decoy database based on the breach tool determining the breach occurred at one of the second layer and the third layer.

13. A computer program product for managing security breaches, the computer program product comprising a computer readable storage device having program instructions embodied therewith, the program instructions being executable by a computer device to cause the computer device to:

determine, by the computer device, an identification of a malicious user and a detected layer of a breach of a production system of a networked computing environment; and route, by the computer device, the malicious user to an element of a decoy system of the networked computing environment based on the identification of the malicious user, wherein:
the decoy system is separate from the production system and comprises elements corresponding to elements of the production system,
the networked computing environment comprises:
an external security device in a first layer;
a production application server and a decoy application server in a second layer;
an internal security device in a third layer; and
a production database and a decoy database in a fourth layer,
the malicious user is routed to the production application server and the decoy database based on the detected layer of the breach being one of the second layer and the third layer, and
the malicious user is routed to the decoy application server and the decoy database based on the detected layer of the breach being the first layer.

14. The computer program product of claim 13, wherein the decoy system stores fake data that is different from real data stored in the production system.

* * * * *